W. E. MARTIN.
MEANS FOR DRIVING AGRICULTURAL IMPLEMENTS.
APPLICATION FILED JAN. 18, 1916.
1,204,808.
Patented Nov. 14, 1916.
2 SHEETS—SHEET 1.
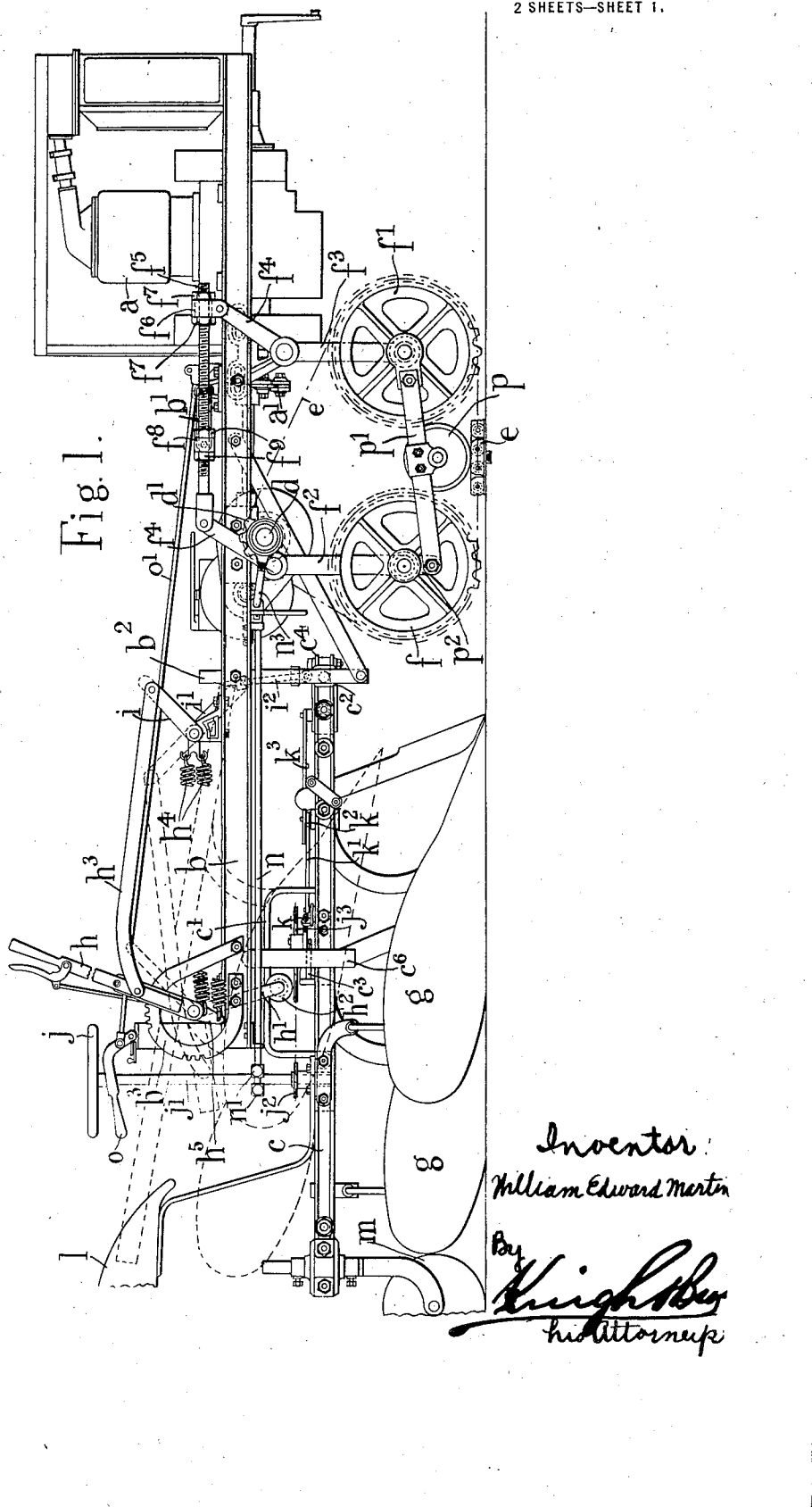

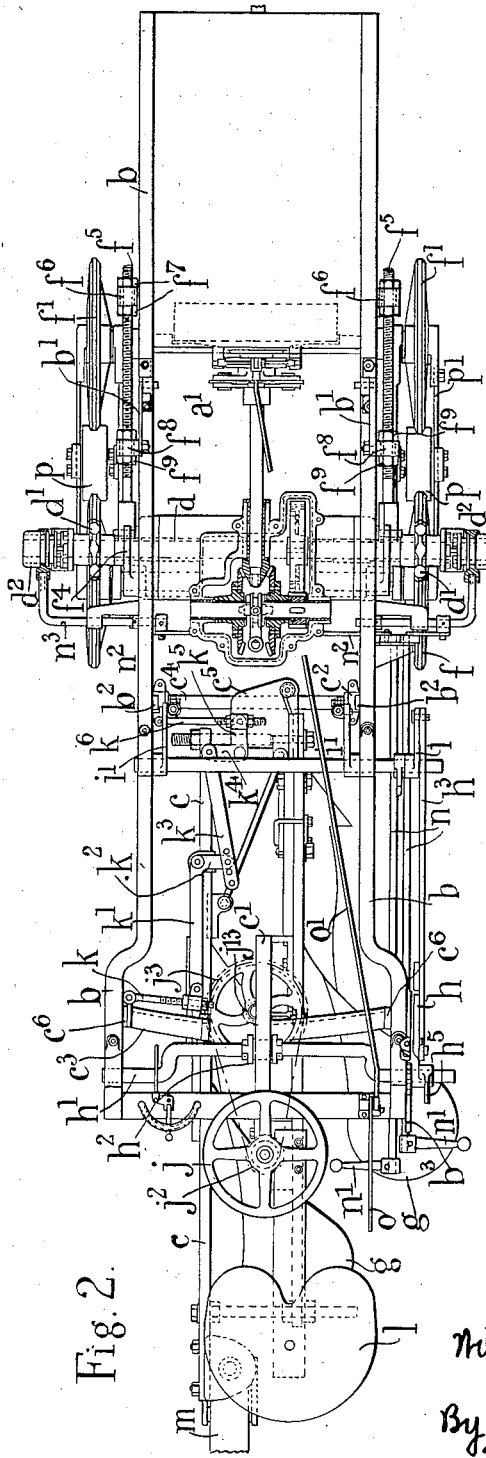

UNITED STATES PATENT OFFICE.

WILLIAM EDWARD MARTIN, OF STAMFORD, ENGLAND.

MEANS FOR DRIVING AGRICULTURAL IMPLEMENTS.

1,204,808.

Specification of Letters Patent.   Patented Nov. 14, 1916.

Application filed January 18, 1916.   Serial No. 72,799.

*To all whom it may concern:*

Be it known that I, WILLIAM EDWARD MARTIN, a subject of the King of Great Britain, residing at Stamford, in the county of Lincoln, England, have invented certain new and useful Improvements in Means for Driving Agricultural Implements, of which the following is a specification.

The object of the present invention is to construct improved means for driving agricultural implements, of that type in which the driving mechanism consists of two separate chains or bands, each of which passes around two wheels. Such mechanism obtains a good hold of the land but does not unduly compress the same. According to the present invention these separate driving mechanisms are driven by a cross shaft, but are each so mounted that they may be separately adjusted vertically, thereby enabling one to run in a furrow and one on unplowed land. Separate means are provided for controlling the driving clutches of the separate driving mechanisms.

The invention is illustrated in the accompanying drawings, in which—

Figure 1 is a side elevation and Fig. 2 is a plan partly in section of the improved driving means applied to a plow.

$a$ is the motor, $b$ is the main frame, and $c$ is the plow frame.

$d$ is a cross shaft driven by the motor $a$, and having at each end a suitable pinion $d'$, to drive the chain $e$, which passes around the chain wheels $f$, $f'$. These chain wheels $f$, $f'$, on each side of the machine, are carried by the lower ends of radius arms, $f^2$, $f^3$, mounted on shafts fixed to the main frame $b$. It will be noticed that the radius arm $f^2$, in Fig. 1, is longer than the radius arm $f^3$, and that the pinion $d'$ is located near to, and slightly above, the axis of the arm $f^2$, and intermediate of the two arms $f^2$, $f^3$. By this arrangement, when the pair of arms $f^2$, $f^3$, on one side of the machine is rotated to raise or lower one driving mechanism, the chain $e$ is retained at approximately the same tension. The said radius arms $f^2$, $f^3$, each form part of a bell-crank lever, the upper members of which are marked $f^4$. These levers $f^4$, on one side of the machine, are connected by a link $f^5$, which has a double function. At one end the link $f^5$, which is screw-threaded, carries a block $f^6$, which is pivoted to the forward lever $f^4$, and which may be adjusted by the nuts $f^7$. By these means suitable tension is applied to the chain $e$ by causing the upper ends of the levers $f^4$ to approach or recede from each other. The parts $f^2$, $f^3$, $f^4$, $f^5$, $f^6$ and $f^7$, are alike on each side of the machine. The link $f^5$ passes through a second block $f^8$, which is anchored to the frame $b$ by the link $b'$. By adjusting the nuts $f^9$ on the link $f^5$, the link is caused to move through the block $f^8$, by which means the radius arms $f^2$, $f^3$, are simultaneously rotated to raise or lower the driving mechanism on one side of the machine. The driving mechanism is shown in its lowest position. The driving mechanism not shown in elevation would be raised to run on unplowed land, and the difference in height between the horizontal parts of the chain $e$ represents the depth of plowing, as one driving mechanism runs in a furrow.

The pinions $d'$ are coupled to the shaft $d$ by means of axially moving clutches $d^2$, which are controlled from one end of the machine by two concentric rocking rods, marked $n$. These rods $n$ are provided with hand levers $n'$, by which they may be separately rocked. Each rocking rod $n$ has a cam or crank which gives motion, direct on the one side, and on the other side by means of a link $n^2$, through suitable intermediate mechanism, to the clutch-operating arms $n^3$. The main clutch $a'$ is operated by the bell-crank lever $o$, which is connected by a link $o'$ to the clutch in any usual or convenient manner.

The chain $e$, intermediate of the wheels $f$, $f'$, is kept in close contact with the land by means of an idle pulley $p$ mounted upon the rod $p'$, one end of which is mounted on the axle of the wheel $f'$, and the other end of which is connected to the axle of the wheel $f$ by a short link $p^2$. The link $p^2$ allows the two wheels $f$, $f'$, to approach or recede from each other when the tension on the chain $e$ is being adjusted. The machine may be provided with a rear wheel $m$. The plows $g$ are fixed on the plow frame $c$, which is hung at its front and back from bell-crank levers $h$, $h'$ and $i$, $i'$. The rear bell-crank lever consists of the hand lever $h$ and lower portion $h'$, which stretches across the machine and is mounted in bearings in each side of the main frame. The lower portion $h'$ carries a roller $h^2$, upon which rests the bridge piece $c'$ rigidly fixed to the plow frame $c$. The front bell-crank lever $i$, $i'$, is connected by a link $i^2$ to the front end of the plow frame $c$, which has channels $c^2$ running up and down the vertical guides $b^2$ fixed on the main frame $b$. The hand lever $h$ moves over the quadrant $b^3$ fixed on the main frame $b$, and is provided with the usual dog by which it may be fixed in the desired position on the quadrant $b^3$. The hand lever $h$ is connected to the lever $i$ by the link $h^3$. Springs $h^4$ connected to an extension $h^5$ of the lever $h$, assist to move the lever $h$ when the plows $g$ are being raised. When the steering wheel $j$, on the stem $j'$, is rotated, it causes the main frame $b$ to move laterally at its rear end with respect to the plows $g$, by means of a sprocket wheel $j^2$, a chain, a sprocket wheel $j^3$ and toothed pinion $j^{18}$ gearing with teeth on the bar $c^3$ forming part of the plow frame. This lateral movement causes the cross bar $c^4$ to slide laterally beneath the plate $c^5$, but in a lesser degree, by means of the link $k$ pivoted to the lever $k'$, $k^2$, pivoted to the frame $c$ and connected by a link $k^3$ to the bell-crank lever $k^4$, $k^5$, pivoted to the link $k^6$ connected to the frame $b$. The machine may also be steered by operating the clutch handles $n'$ and unclutching one driving mechanism. The plow frame $c$ carries a seat $l$.

The plow mechanism herein shown and described forms no part of the present invention.

Plows only are shown in the drawing but these may be replaced by cultivators or the like.

What I claim as my invention is:—

1. In means for driving agricultural implements, the combination of a pair of chain wheels on each side of the machine, an endless chain on each pair of chain wheels, presenting an approximately horizontal driving stretch of the chain between each pair of chain wheels, and means for simultaneously raising both chain wheels of one pair independently of the other pair of chain wheels whereby the lower stretches of both chains always remain horizontal, substantially as set forth.

2. In means for driving agricultural implements, the combination of a pair of bell-crank levers on each side of the machine, a chain wheel carried by the lower end of each bell-crank lever, a chain running on a pair of chain wheels on each side of the machine and having a lower horizontal driving stretch, means for connecting the upper members of each pair of bell-crank levers, and means for simultaneously imparting rotary motion to a pair of bell-crank levers on one side of the machine independently of the pair of bell-crank levers on the other side of the machine, substantially as set forth.

3. In means for driving agricultural implements, the combination of a driving mechanism on each side of the machine, each driving mechanism consisting of two chain wheels, a chain on said wheels, two bell-crank levers on the lower member of each of which one of the chain wheels is mounted, a screw-threaded link connecting the upper members of the bell-crank levers, a main frame, a block anchored to the main frame and through which the screw-threaded link passes, and nuts on the screw-threaded link acting in conjunction with the block to adjust the position of the screw-threaded link, substantially as set forth.

4. In means for driving agricultural implements, the combination of a driving mechanism on each side of the machine, each driving mechanism consisting of two chain wheels, a chain on said wheels, two bell-crank levers on the lower member of each of which one of the chain wheels is mounted, a screw-threaded link connecting the upper members of the bell-crank levers, means for simultaneously rotating the bell-crank levers, a block sliding on the link to which the upper member of one of the bell-crank levers is pivoted, and nuts on the link located on each side of said sliding block by means of which the said block and consequently the tension of the chain is adjusted, substantially as set forth.

5. In means for driving agricultural implements, the combination of a driving mechanism on each side of the machine, each driving mechanism consisting of two chain wheels, a chain on said wheels, two bell-crank levers on the lower member of each of which one of the chain wheels is mounted, a screw-threaded link connecting the upper members of the bell-crank levers, means for simultaneously rotating the bell-crank levers, a block sliding on the link to which the upper member of one of the bell-crank levers is pivoted, nuts on the link located on each side of said sliding block by means of which the said block and consequently the tension of the chain is adjusted, a bar connected at one end to one of the axles of the chain wheels, a short link connecting the other end of the bar to the axle of the other chain wheel, and a pulley carried by said bar retaining the chain intermediate of the chain wheels in contact with the land, substantially as set forth.

6. In means for driving agricultural implements, the combination of a driven cross shaft, a driving mechanism on each side of the machine, each driving mechanism consisting of two chain wheels, a chain on said wheels, two bell-crank levers on the lower member of each of which one of the chain wheels is mounted, a pinion on the end of the cross shaft giving motion to the chain, and means for simultaneously rotating the two bell crank levers on one side of the machine independently from those on the other side of the machine substantially as set forth.

7. In means for driving agricultural implements, the combination of a driven cross shaft, a driving mechanism on each side of the machine, each driving mechanism consisting of two chain wheels, a chain on said wheels, two bell-crank levers on the lower member of each of which one of the chain wheels is mounted, means for rotating said bell-crank levers on one side of the machine independently from those on the other side of the machine, a pinion on the end of the cross shaft giving motion to the chain, a clutch for connecting the pinion to the cross shaft, and means for operating said clutch, substantially as set forth.

8. In means for driving agricultural implements, the combination of a driven cross shaft and a driving mechanism on each side of the machine, each driving mechanism consisting of two chain wheels, two radius arms on each of which one of the chain wheels is mounted, one of said radius arms being longer than the other, means for simultaneously rotating said radius arms, a chain running on said chain wheels, and a pinion on the cross shaft driving said chain, the cross shaft being so mounted that the pinion is located near to and slightly above the axis of the longer radius arm and intermediate of the two radius arms, substantially as set forth.

In witness whereof I have hereunto set my hand.

WILLIAM EDWARD MARTIN.